United States Patent [19]
Chen et al.

[11] Patent Number: 6,063,234
[45] Date of Patent: May 16, 2000

[54] TEMPERATURE SENSING SYSTEM FOR USE IN A RADIO FREQUENCY ENVIRONMENT

[75] Inventors: Jian Janson Chen, Fremont; William S. Kennedy, Redwood Shores, both of Calif.

[73] Assignee: Lam Research Corporation, Fremont, Calif.

[21] Appl. No.: 08/927,030

[22] Filed: Sep. 10, 1997

[51] Int. Cl.$^7$ ..................................................... C23F 1/02
[52] U.S. Cl. ........................ 156/345; 219/390; 219/121; 324/95; 342/159
[58] Field of Search ................................ 219/390, 10.77, 219/121; 73/362 SC; 324/95; 242/159; 374/161; 128/303.18; 156/345

[56] References Cited

U.S. PATENT DOCUMENTS

| | | | |
|---|---|---|---|
| 3,567,895 | 3/1971 | Paz | 219/10.77 |
| 4,047,435 | 9/1977 | Keith | 73/362 SC |
| 4,115,184 | 9/1978 | Poulsen | 219/121 |
| 4,411,266 | 10/1983 | Cosman | 128/303.18 |
| 4,628,256 | 12/1986 | Powell | 324/95 |
| 5,376,213 | 12/1994 | Ueda et al. | 156/345 |
| 5,473,332 | 12/1995 | James et al. | 342/159 |
| 5,483,041 | 1/1996 | Peck et al. | 219/390 |
| 5,728,253 | 3/1998 | Saito et al. | 156/345 |
| 5,741,070 | 4/1998 | Moslehi | 374/161 |

OTHER PUBLICATIONS

DiBartolomeo et al, "Simple Phase–sensitive detector for Wheatstone bridge resistance measurements", Review of Scientific Instrumets (56) 5, pp. 755–757, May 1985.

Hawary et al, "AC High stability microprocessor–based temperature controller for use at high temperatures", Review of Scientific Instrumets (55) 8, pp. 1333–1335, Aug. 1984.

Ivanov et al, "Thermocouple diagnostics in a nonequillibruim plasma", High Temperature (80) 17, pp. 696–701, Jan. 1980.

Hosokawaw et al. "Real–time temperature monitoring using a noncontact thermocouple for the next generation sputtering system", J.Vac.Sci.Technol.B 14(1), Feb. 1996.

*Primary Examiner*—Thi Dang
*Assistant Examiner*—Rudy Zervigon
*Attorney, Agent, or Firm*—Beyer Weaver Thomas & Nguyen

[57] ABSTRACT

The invention relates to a temperature sensing system that accurately measures temperatures of articles or areas using a contact sensor even in a high radio frequency environment. The temperature sensing system includes a sensor probe that contacts with an article or area that is to have its temperature monitored, and a control circuit to amplify signals from the sensor probe. When significant amounts of radio frequency (RF) interference are present, the temperature sensing can be provided with RF shielding, RF filtering, isolated amplifying and/or multiple stages of low pass filtering that suppress the RF interference. The temperature sensing system is particularly well suited for monitoring and measuring temperatures within semiconductor manufacturing equipment, such as etching, deposition, and other processing chambers.

33 Claims, 9 Drawing Sheets

TEMPERATURE SENSING SYSTEM FOR USE IN A RADIO FREQUENCY ENVIRONMENT

BACKGROUND OF THE INVENTION

1. Field of the Invention

The present invention relates to temperature sensing and, more particularly, to temperature sensing using contact sensors.

2. Description of the Related Art

Temperature sensing using temperature sensors has in the past been performed in many ways for many purposes. In general, temperature measurement can be divided into two categories: contact temperature measurement and non-contact temperature measurement. In the contact category, temperature sensing devices contact a surface whose temperature is to be measured. In effect, the contact temperature sensors measure their own the temperature and tend to be slow in responding to temperature changes. On the other hand, in the non-contact category, temperature sensors measure optical emission (e.g., infrared radiation) emitted from the surface. The non-contact temperature sensors tend to respond more quickly than contact temperature sensors, but are more expensive.

In situations in which the temperature sensing must occur during the presence of significant amounts of radio frequency (RF) interference, the temperature sensing is made more difficult. Specifically, the RF interference tends to interfere with electrical signals that represent the temperature measurement. Hence, temperature measurement is often not possible because the electrical signals normally used to represent the temperature measurement are overwhelmed by the RF interference. One example of an environment having significant amounts of RF interference is semiconductor manufacturing equipment such as semiconductor wafer processing equipment where RF signals are used to generate discharges.

For contact temperature measurement, there are various ways to measure temperature, e.g., thermistors, resistance temperature devices (RTD), thermocouples, platinium resistance bulbs, bulk silicon devices and solid state devices, but temperature sensing in an environment having significant RF interference remains technologically challenging as temperature sensors pickup the RF interference. Another problem with contact temperature measurement is that the temperature sensors can perturb the RF tuning of the discharge in a semiconductor processing chamber. With the RF tuning perturbed, the processing within the semiconductor processing chamber is no longer reliable.

For non-contact temperature measurement, infrared and phosphor fluorescence techniques can be used for temperature sensing in a RF environment. Some of these optical approaches are able to utilize optical isolation to avoid the RF interference, others are not. The optical isolation could, for example, be provided by shining pulsed ultraviolet light onto a phosphor which is coated on a surface, then determining the temperature from the reflected photons from the phosphorous surface. The optical isolation could alternatively use the amount of infrared light emitted from a surface to determine the temperature. Some infrared techniques, such as infrared thermocouples, remain affected by RF interference. Even if these optical approaches are able to provide optical isolation that mitigates RF interference, there are some problems with these approaches.

Within a processing chamber, there is a glow discharge that produces a full spectrum of electromagnetic radiation ranging from RF, microwave and infrared to visible and ultraviolet lights. One problem is that the optical approaches must deal with the optical interference from the glow discharge internal to the processing chamber. The ability to monitor temperatures internal to a processing chamber is desirable because temperature plays a significant role in the semiconductor processing performed in the processing chamber and variations in temperature can cause processes to vary and therefore fail. More particularly, in the case of semiconductor manufacturing equipment, the temperature of various components within the processing chamber affects the processing performed by the semiconductor manufacturing equipment. For example, in the case of etching, the etch process should occur within a predetermined temperature range and when the temperature exceeds the predetermined temperature range, the etching reactions will be altered, thereby causing the etch process drift. More seriously, if a processing chamber is overheated for an extended length of time, but not noticed by the operators because of lack of temperature monitoring, the process chamber can be seriously damaged. In this case, the semiconductor processing equipment must be shutdown for maintenance, Any major shutdown of equipment in a semiconductor manufacturing environment will increase the cost of production and should be prevented if possible. Another problem with these optical approaches is that the cost for such temperature monitoring systems is expensive, since a spectrometer or other sophisticated electro-optic instruments may be used.

Hence, there is a need for improved techniques to monitor temperatures internal to processing chambers of semiconductor manufacturing equipment.

SUMMARY OF THE INVENTION

Broadly speaking, the invention relates to a temperature sensing system that accurately measures temperatures of articles or areas using a contact sensor even in a high radio frequency environment. The temperature sensing system includes a sensor probe that contacts with an article or area that is to have its temperature monitored, and a control circuit to amplify signals from the sensor probe. When significant amounts of radio frequency (RF) interference are present, the temperature sensing system can be provided with an RF filter circuit that suppresses the RF interference. The temperature sensing system is particularly well suited for monitoring and measuring temperatures within semiconductor manufacturing equipment, such as etching, deposition, and other processing chambers.

The invention can be implemented in numerous ways, including as a system, apparatus, or method. Several embodiments of the invention are discussed below.

As a temperature sensing system, one embodiment of the invention includes: a sensor probe having a housing and a thermal sensing device positioned within the housing, the thermal sensing device produces an electrical signal based on a measured temperature; a shielded cable coupled to the sensor probe; a RF filter circuit coupled to the shielded cable, the RF filter circuit receives the electrical signal produced by the sensor probe via the shielded cable and removes significant amounts of RF interference from the electrical signal and outputs a filtered electrical signal; and a control circuit coupled to the RF filter circuit, the control circuit amplifies the filtered electrical signal.

As a temperature sensing probe, an embodiment of the invention includes: a housing containing a thermal sensing device positioned within the housing, the thermal sensing device produces an electrical signal based on a measured temperature; and a shielded cable containing a least two wires, the electrical signal from the thermal sensing device is provided across the at least two wires.

As a method for sensing temperature of an article within a processing chamber used to manufacture semiconductor devices, an embodiment of the invention includes the acts of: placing a temperature sensing probe into the processing chamber through an opening in the processing chamber; abutting the temperature sensing probe against the article; receiving an electrical signal from the temperature sensing probe that indicates the temperature of the article; RF filtering the electrical signal to remove significant amounts of any RF interference induced onto the electrical signal; and amplifying the filtered electrical signal to produce an output signal that correlates to the temperature of the article.

As a temperature sensing system, another embodiment of the invention includes: a temperature sensing device that produces an electrical signal based on a measured temperature; RF filter means for receiving the electrical signal produced by the sensor probe and removing significant amounts of RF interference from the electrical signal and outputs a filtered electrical signal; and amplification means for amplifying the filtered electrical signal.

As a semiconductor manufacturing apparatus, an embodiment of the invention includes: a processing chamber; a RF energy source; a temperature sensing probe provided internal to the processing chamber to measure a temperature internal to the processing chamber, the temperature sensing probe including an electrical signal based on a measured temperature; a RF filter circuit, the RF filter circuit receives the electrical signal produced by the temperature sensing probe and removes significant amounts of RF interference from the electrical signal and outputs a filtered electrical signal; and an amplifier to amplify the filtered electrical signal to produce an output signal that correlates to the measured temperature.

The advantages of the invention are numerous. One advantage of the invention is that accurate temperature measurements even in the presence of large amounts of RF interference are available at low cost. Another advantage of the invention is that temperature of components, devices or areas within semiconductor manufacturing equipment are obtainable without significant disturbance to the semiconductor processing being performed.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–12. However, those skilled in the art will readily appreciate that the detailed description given herein with respect to these Figures is for explanatory purposes as the invention extends beyond these limited embodiments.

The invention relates to a temperature sensing system that accurately measures temperatures of articles or areas using a contact sensor even in a high radio frequency environment. The temperature sensing system includes a sensor probe that contacts with an article or area that is to have its temperature monitored, and a control circuit to amplify signals from the sensor probe. When significant amounts of radio frequency (RF) interference are present, the temperature sensing system can be provided with an RF filter circuit that suppresses the RF interference. The temperature sensing system is particularly well suited for monitoring and measuring temperatures within semiconductor manufacturing equipment, such as etching, deposition, and other processing chambers.

Figure 1:
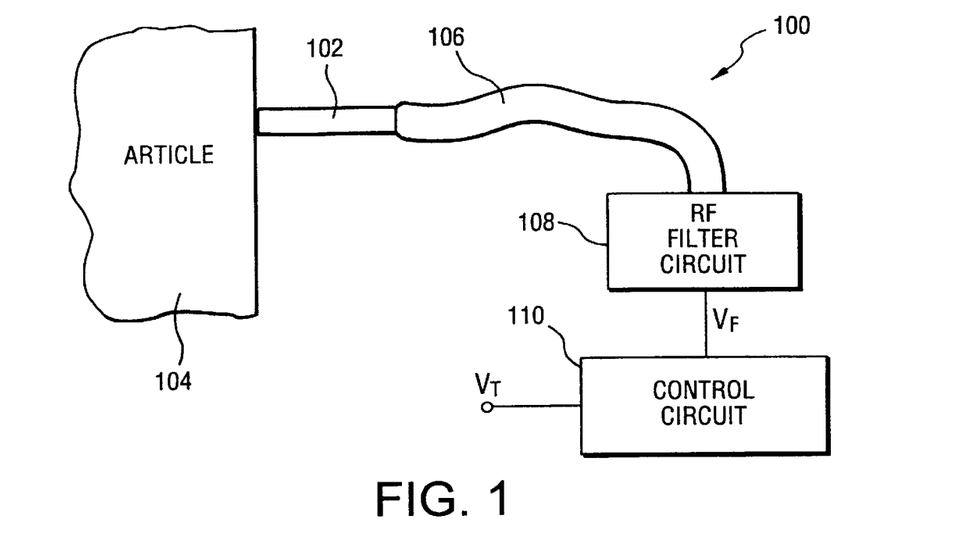
FIG. 1 is a temperature sensing system according to a basic embodiment of the invention.

FIG. 1 is a temperature sensing system 100 according to a basic embodiment of the invention. The temperature sensing system 100 includes a sensor probe 102 that measures the temperature of an article 104. More particularly, the sensor probe 102 is placed against or in contact with the article 104 to monitor the temperature of the article 104. The sensor probe 102 produces electrical signals based on the temperature of the article 104. These electrical signals are transmitted through a shielded cable 106 to a radio frequency (RF) filter circuit 108. The RF filter circuit 108 operates to filter out undesirable radio frequency components on the electrical signals being received from the probe sensor 102 via the shielded cable 106. The resulting filtered signals ($V_F$) are output by the RF filter circuit 108 and supplied to a control circuit 110. The control circuit 110 operates to further condition the filtered electrical signals ($V_F$) and output a voltage signal ($V_T$). The conditioning performed by the control circuit 110, for example, includes additional RF filtering and/or amplification of the electrical signals. The output voltage ($V_T$) is a voltage signal that correlates to the temperature of the article 104 being monitored.

When the temperature sensing system 100 is used in an environment in which radio frequency interference is prevalent, it is known to be very difficult to obtain electrical signals from a temperature sensor such that the electrical signals are not completely corrupted or overwhelmed by the RF interference that couples onto the signals. However, according to the invention, the temperature sensing system 100 is designed to have the capability to substantially shield itself from radio frequency interference as well as to filter out any radio frequency interference that does reach the electrical signals.

Figure 2:
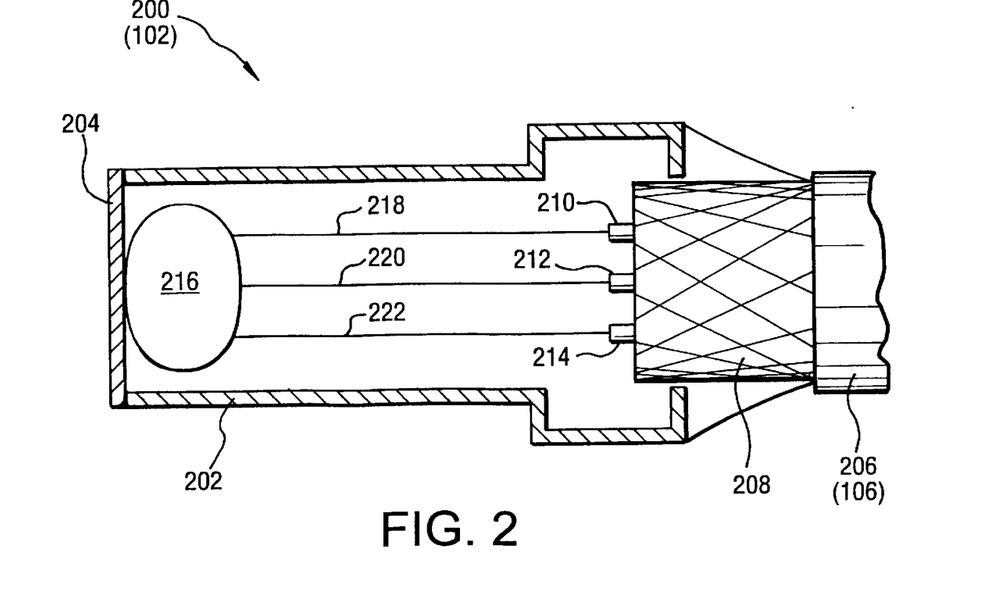
FIG. 2 is a cross-sectional diagram of a temperature sensing probe according to an embodiment of the invention.

FIG. 2 is a cross-sectional diagram of a temperature sensing probe 200 according to an embodiment of the invention. The temperature sensing probe 200 represents an embodiment of the sensor probe 102 illustrated in FIG. 1.

The temperature sensing probe 200 includes a housing 202 having an opening in the middle, a first end with a cap 204 and a second end with an opening for receiving a cable 206. The cable 206 is constructed to have an outer insulating layer that covers an intermediate shield layer 208 formed of a wire-mesh. In this embodiment, the cable 206 contains a first wire 210, a second wire 212 and a third wire 214. These wires 210–214 are carried inside the cable 206 and internal to both the shield layer 208 and the outer insulating layer of the cable 206. The wire-mesh of the shield 208 is typically soldered or welded to the second end of the housing 202 so that RF interference may not be easily coupled onto electrical signals carried by wires within the housing 202 or the cable 206, and so that the cable 206 is secured to the housing 202. The temperature sensing probe 200 is able to advantageously have a small size, for example, the diameter of the housing 200 is on the order of ⅛" though the size will vary with application.

A temperature sensing device 216 is placed at the first end of the housing 202. In this embodiment, the temperature sensing device 216 includes three wires, a first wire 218, a second wire 220 and a third wire 222. The wires 218, 220 and 222 of the temperature sensing device 216 are respectively coupled to the wires 210, 212 and 214 of the cable 206.

In one embodiment, the temperature sensing device 216 is a thermistor that produces a voltage difference between a pair of wires, as only the two wires are needed in this embodiment. The temperature sensing device 216 can also be a linear network thermistor that includes a plurality of thermistor elements, and in this type of embodiment at least three wires are used. A linear network thermistor generally has a more linear voltage verses temperature characteristic than does a single thermistor. In the embodiment illustrated in FIG. 2, the temperature sensing device 216 can be thought of as a linear network thermistor (e.g., Fenwal Electronics 137-292ZFT-D01) having a first thermistor element connected between the wires 218 and 220 and having a second thermistor element connected between the wires 220 and 222. The first thermistor element induces a voltage signals between wires 218 and 220 depending on the temperature of the temperature sensing device 216, and the second thermistor element induces a voltage signal between the wires 220 and 222 depending on the temperature of the temperature sensing device 216. The temperature sensing device 216 is not limited to thermistors, but can be a variety of other type of temperature sensors that provide thermoelectric effects. As examples, the temperature sensing device 216 could also be a solid state sensor, a thermocouple, or a Resistance Temperature Device (RTD). Regardless of the type of temperature sensor used, it is preferable that the voltage verses temperature characteristics of the temperature sensor be substantially linear over an operating range for the temperature sensing system.

To improve the thermal coupling between the temperature sensing device 216 and the cap 204 of the housing 202, a layer of thermally conductive material (e.g., grease) can be placed between the cap 204 and the temperature sensing device 216. Similarly, a layer of thermally conductive material (e.g., grease) can be placed between the housing 202 (namely, the cap 204) and the article 104 having its temperature measured. Also, the respective solder connections between the wires 218, 220 and 222 of the temperature sensing device 216 and the wires 210, 212 and 214 of the cable 206, may be coated with an electrically insulative epoxy or other insulator to provide electrical isolation from the housing 202 or other wires.

The housing 202 is conductive and grounded so as to provide some RF immunity. However, when the housing 202 is used within a semiconductor processing chamber, the housing 202 should not contaminate the processing in the semiconductor processing chamber. As an example, in one semiconductor processing chamber, the RF power is 1100 Watts at a top electrode and 850 Watts at a bottom electrode at 13.56 MHz. Accordingly, there is a trade-off between conductivity and contamination. In one embodiment, the housing 202 is metallic such as stainless steel or brass. Hence, in general, the housing 202 is made from a material that is conductive but does not substantially contaminate a processing chamber when the housing is inserted therein. As examples, the housing can be formed from a metallic material such as stainless steel, copper or brass. Stainless steel (SS304) has shown to be sufficiently conductive and yet not substantially contaminating the processing chamber.

For the housing 202 to effectively provide a RF shield, the wall thickness of the housing 202 should be substantially greater than the skin depth at the frequency of the RF interference. The RF skin depth is given by the following equation.

$$d = \frac{503.3(m)}{\sqrt{f \mu \sigma_r}}$$

where f, $\mu_r$, and σ are frequency in Hertz (Hz), relative permeability, and electrical conductivity in $(\Omega\text{-m})^{-1}$, respectively. However, the wall thickness should not be too thick, otherwise the thermal loss due to the wall conductance may be substantial and result in measurement errors. Therefore, for given the material of the metallic housing and the RF frequency of the interference, there is an optimal range of wall thickness. In the case of semiconductor manufacturing equipment performing a typical wafer etch or Chemical Vapor Deposition (CVD) process, the top and bottom electrodes are powered by two different frequencies. Improved performance is obtained by considering the variation of skin depths for different materials and for the range of RF frequencies of interest. The skin depths for stainless steel 304 (SS304) and brass at 4 MHz and 13.56 MHz are listed in Table 1.

TABLE 1

| RF Frequency f (MHz) | d (μm) for SS304 σ = 1.4 × 10⁶/Ω – m | d (μm) for Brass σ = 2.6 × 10⁷/Ω – m |
| --- | --- | --- |
| 4 | 213 | 50 |
| 13.56 | 116 | 27 |

Because $$d \propto \frac{1}{\sqrt{f}},$$

the skin depth at lower frequency is always longer than that at higher frequency, therefore the sensor is affected more significantly by the lower frequency. Hence, often it is advantageous that the skin depth at the lower frequency be used to determine the proper wall thickness. For stainless steel, d=213 μm at 4 MHz. Preferably the wall thickness is at least 2d=0.4 mm, such that the RF field penetrating inside the stainless steel housing is reduced to less than 13.5% ($e^{-2}$) of the incident field.

The signal produced on a thermocouple is approximately a millivolt while the signal on a thermistor can be approximately a volt. As such, thermistors generally have better sensitivity than thermocouples. A solid state sensor rectifies the half cycle of the RF pickup to produce a non-zero DC component. Unfortunately, this DC component is mixed with the DC signal, passes through the RF filters, and is amplified by the control circuit, causing a large measurement error. Therefore, temperature sensors like a thermocouple and a solid state sensor are affected by the RF interference more significantly than a thermistor and thus require better RF shielding. One way to provide even better RF shielding is to use multiple layer of shields. For example, the temperature sensing probe 200 could include a second housing or shield layer beside the housing 202 that provides a first shield layer. Preferably, each of the two shield layers surround the temperature sensing device 216 and its wires, and the second shield layer surrounds the first shield layer. The first and second shield layers are also preferably separated by a dielectric insulation and grounded by separate grounds.

Figure 3:
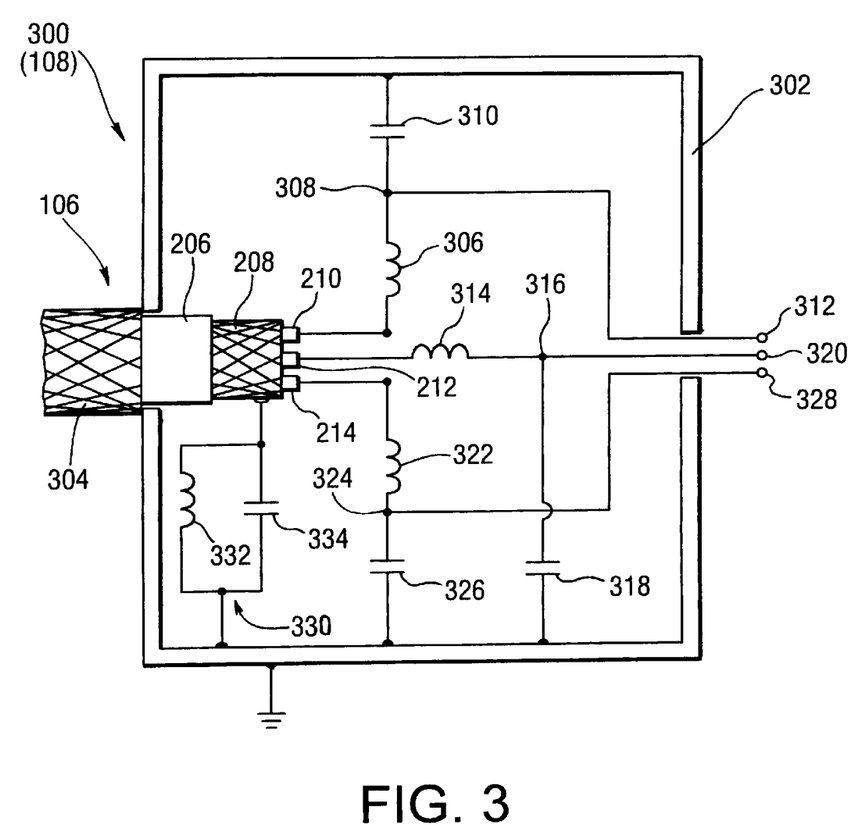
FIG. 3 is a schematic diagram of a RF filter circuit according to an embodiment of the invention.

FIG. 3 is a schematic diagram of a RF filter circuit 300 according to an embodiment of the invention. The RF filter circuit 300 represents an embodiment of the RF filter circuit 108 illustrated in FIG. 1.

The RF filter circuit 300 is contained within a metal filter box 302. The conductive nature of the metal filter box 302 is grounded and provides some RF immunity from RF interference entering into the metal filter box 302. The metal box 302 includes an opening to receive the end of the shielded cable 106. A portion of the cable 106 is received inside the metal filter box 302. The shield layer 208 (FIG. 2) of the cable 106, 206 is directly exposed to RF interference and is therefore RF hot. When the cable 106, 206 is carried outside the processing chamber, it is preferably further shielded for safety purposes to prevent the RF interference in the shield layer 208 from radiating. Preferably, the shielded cable 106, 206 includes an additional insulation layer over the outer insulation layer of the cable 106, 206 and an external shield 304 over the additional insulation layer of the cable 106, 206. In this way, the cable 106, 206 is able to be safely handled by users. Preferably, the external shield 304 is connected to the metal filter box 302 so as to commonly ground the temperature sensing probe 200, the external shield layer 304, the internal shield layer 208, and the metal filter box 302.

The wires 210, 212 and 214 of the cable 206 are exposed inside the filter box 302 and individually provided to filter circuitry. An inductor 306 is connected between the first wire 210 and a first node 308. A capacitor 310 is connected between the first node and the filter box 302 itself. The filter box 302 is directly grounded and thus the connecting of the capacitor 310 to the filter box 302 grounds one side of the capacitor 310. The first node 308 is also coupled to a first output line 312. The voltage signal output from the first output line 312 represents a portion of the filtered electrical signal ($V_F$) that is supplied to the control circuit 110. Similar to the signal path from the first wire 210 to the first output line 312, an inductor 314 is connected between the second wire 212 and a second node 316. A capacitor 318 is connected between the second node 316 and ground via the filter box 302. The second node 316 is also connected to a second output line 320. The voltage signal output from the second output line 320 represents another portion of the filtered electrical signal ($V_F$) that is supplied to the control circuit 110. An inductor 322 is connected between the third wire 214 and a third node 324. A capacitor 326 is connected between the third node 324 and ground via the filter box 302. The third node 324 is also connected to a third output line 328. The voltage signal output from the third output line 328 represents still another portion of the filtered electrical signal ($V_F$) that is supplied to the control circuit 110. Hence, each of the output lines from the cable 106 are filtered by filter circuits formed by an inductor and a capacitor that operate to filter out unwanted RF signals from each of the respective wires 210–214.

In addition to the individual filter circuits for each of the wires 210–214 of the cable 106, the RF filter circuit 300 also includes a filter circuit 330 for the internal shield layer 208 of the cable 106. The filter circuit 330 operates to suppress transients and RF interference from the internal shield layer 208 of the cable 106. The filter circuit 330 includes an inductor 332 and a capacitor connected in parallel between the internal shield layer 208 and the filter box 302.

One particular embodiment of the filter box 302 that has been effective for substantially attenuating RF interference in semiconductor manufacturing equipment, the inductors 306, 314 and 322 are 44 μH and the capacitors 310, 318 and 326 are 2 nF. Each of the filter circuits for the wires 210–214 provides 28 dB attenuation for the RF interference. Further, the filter circuit 330 attenuates RF interference that is present in the internal shield layer 208. In one example, the inductor 332 is 44 μH and the capacitor is 335 is 10 pF. This particular design of the filter circuit 330 has shown to be useful in the case of monitoring temperatures internal to semiconductor manufacturing equipment. By coupling the internal shield layer 208 to ground through the filter circuit 330 the internal shield layer 208 is effectively DC grounded (to eliminate any stray DC voltage pick-up in the strong magnetic field) but maintains a relatively high impedance to the RF so that the RF tuning of the discharge in the semiconductor manufacturing equipment is not perturbed. For example, the plasma in a processing chamber has a resistance of about 10 Ω and a reactance of about +30 Ω at 13.56 MHz; hence, the reactance of the filter circuit 330 can be about 1700 Ω at 13.56 MHz. Preferably, the impedance of the filter circuit 330 is relatively flat for several RF frequencies. In the above-described embodiment of the filter box 302, the impedance of the filter circuit 330 is 1500 Ω

(inductive) at 4 MHz and 1700 Ω (capacitive) at 13.56 MHz, so that RF filtering by the filter circuit 330 remains flat at these RF driving frequencies.

Figure 4:
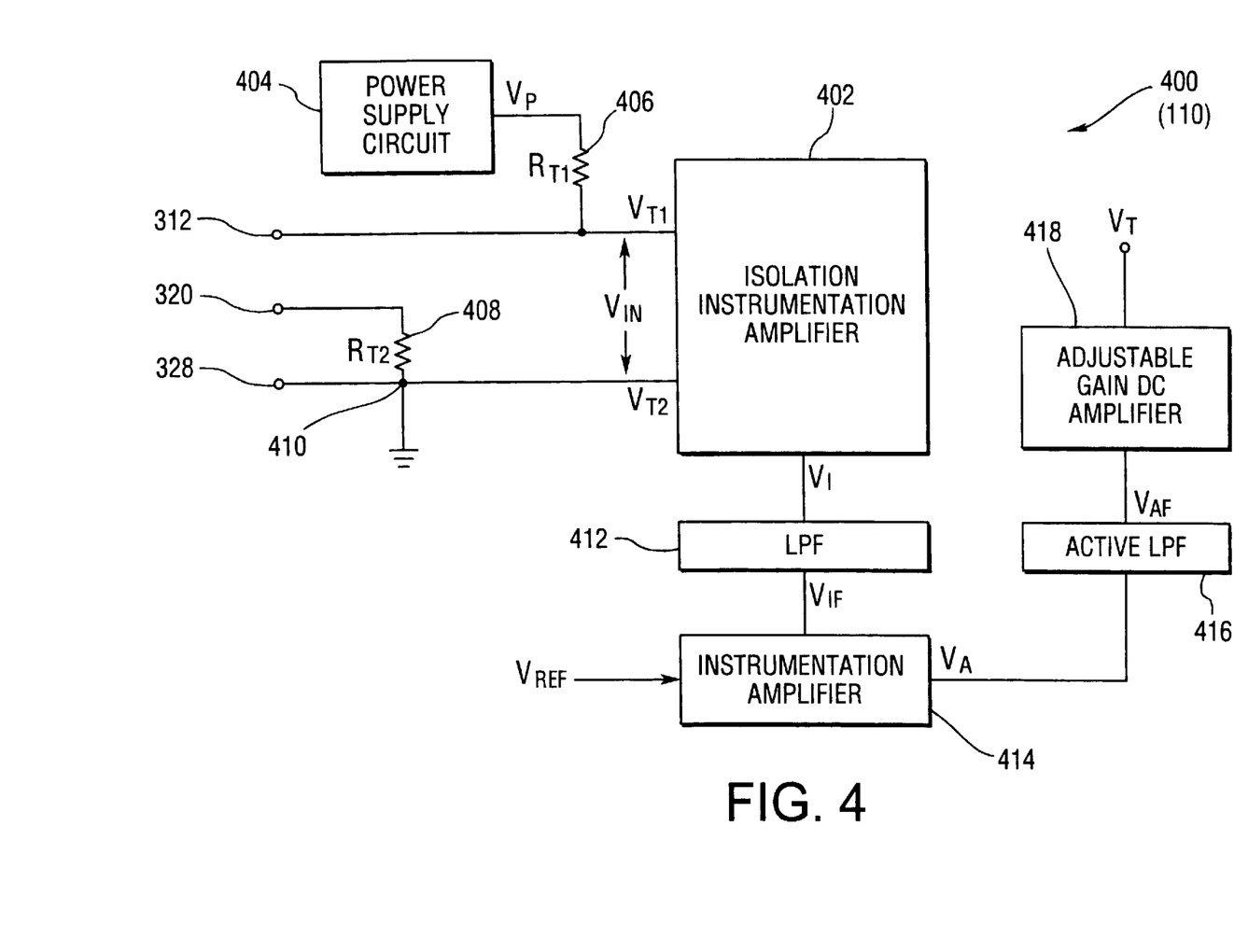
FIG. 4 is a block diagram of a control circuit according to an embodiment of the invention.

FIG. 4 is a block diagram of a control circuit 400 according to an embodiment of the invention. The control circuit 400 represents a detailed embodiment of the control circuit 110 illustrated in FIG. 1.

The control circuit 400 receives the output lines 312, 320 and 328 from the filter circuit 300. The first and third output lines 312 and 328 are coupled to input terminals of an isolation instrumentation amplifier 402. The difference between the voltage levels on the first and third output lines ($V_{T1}$ and $V_{T2}$, respectively) represents an input differential voltage ($V_{IN}$). A power supply circuit 404 produces a power supply voltage ($V_P$) that is used in conjunction with the sensor probe 102 to obtain the input differential voltage ($V_{IN}$). The power supply voltage ($V_P$) is supplied to the first output line 312 through a resistor ($R_{T1}$) 406. Also, a resistor ($R_{T2}$) 408 is coupled between the second output line 320 and the third output line 328 at a node 410. The node 410 is also directly connected to ground. The resistor ($R_{T1}$) 406 and the resistor ($R_{T2}$) 408 are resistors that are selected based on the properties of the temperature sensing device 216 in the embodiment illustrated in FIG. 2. More particularly, in this embodiment, the temperature sensing device 216 is a linear thermistor network, and the resistors 406 ($R_{T1}$) and 408 ($R_{T2}$) are properly balanced to provide linear characteristics. Preferably, the manufacturer of the linear thermistor network supplies the pair of resistors to be used with the linear thermistor network as the resistors 406 ($R_{T1}$) and 408 ($R_{T2}$). For example, in one embodiment of a linear thermistor network (FENWALL Electronics 137-292ZFT-D01), the resistors 406 ($R_{R1}$) and 408 ($R_{T2}$) can have resistances of 3.6 kΩ and 5.8 kΩ, respectively.

The isolation instrumentation amplifier 402 receives the input differential voltage ($V_{IN}$) and produces an output voltage signal ($V_I$) that is AC isolated and DC coupled from the input differential voltage ($V_{IN}$). The AC isolation is provided by the isolation instrumentation amplifier 402 which rejects the residual RF interference remaining on or induced on the output signal lines 312, 320 and 328 from coupling through to the output voltage signal ($V_I$). In addition, any common RF pickup (with identical magnitude and phase) present on the lines 312, 320 and 328 will be seen as common-mode voltages to the isolation instrumentation amplifier 402 and will be rejected from the output voltage signal ($V_I$).

The output voltage signal ($V_I$) produced by the isolation instrumentation amplifier 402 is then supplied to a low pass filter (LPF) 412. The low pass filter (LPF) 412 operates to filter out high frequency signals as well as prevent unwanted oscillations from occurring in the subsequent circuitry of the control circuit 400. The low pass filter (LPF) 412 outputs a filtered voltage signal ($V_{IF}$). Then, the filtered voltage signal ($V_{IF}$) produced by the low pass filter (LPF) 412 is supplied to an instrumentation amplifier 414. The instrumentation amplifier 414 amplifies the difference between the filtered voltage signal ($V_{IF}$) and a reference voltage ($V_{REF}$). The instrumentation amplifier 414 outputs an amplified output signal ($V_A$).

The amplified voltage signal ($V_A$) output from the instrumentation amplifier 414 is then supplied to an active low pass filter (LPF) 416. The active low pass filter (LPF) 416 outputs a filtered voltage signal ($V_{AF}$). The filtered, amplified voltage signal ($V_{AF}$) is then supplied to an adjustable gain DC amplifier 418. The adjustable gain DC amplifier 418 adjusts the DC portion of the filtered voltage signal ($V_{AF}$) and produces a voltage temperature signal ($V_T$). The voltage temperature signal ($V_T$) represents the temperature of the article 104 being monitored.

Figure 5:
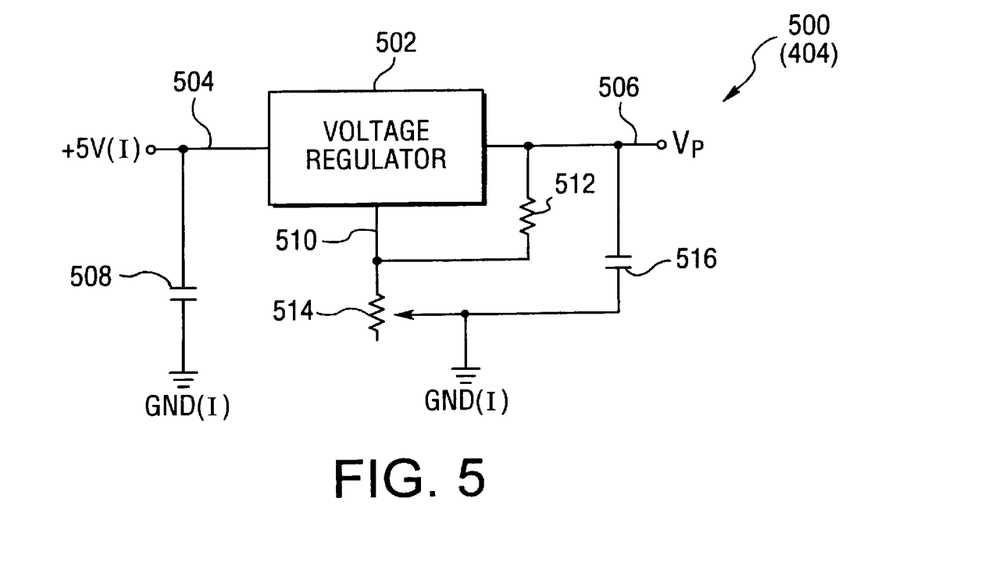
FIG. 5 is a schematic diagram of a power supply circuit according to an embodiment of the invention.

FIG. 5 is a schematic diagram of a power supply circuit 500 according to an embodiment of the invention. The power supply circuit 500 represents a detailed embodiment of the power supply circuit 404 illustrated in FIG. 4. The power supply circuit 500 is connected to a power supply (e.g., 5 V(I)) and outputs the power supply voltage ($V_P$) (e.g., 2 V). The power supply for the power supply circuit 500 is an independent power supply that includes an independent ground (GND(I)).

The power supply circuit 500 is formed around a voltage regulator 502 (e.g., LM317T from National Semiconductor). The voltage regulator 502 receives the supply voltage over an input line 504 and outputs the power supply voltage ($V_P$) on an output line 506. The input line 504 is also coupled to the independent ground (GND(I)) through a capacitor 508. Additionally, so that the power supply circuit 500 can be adjustable, feedback circuitry provides for an adjustable resistance. In particular, a control terminal for the voltage regulator 502 has a control signal line 510 that couples to a first resistor 512 and a second resistor 514. The first resistor 512 is coupled between the control signal line 510 and the output line 506. The second resistor 514 is an adjustable resistance that couples to the independent ground (GND(I)). Further, the output line 506 is also coupled to the independent ground (GND(I)) through a capacitor 516. The capacitors 508 and 516 filter out ripples in the DC voltage lines 504 and 506.

Figure 6:
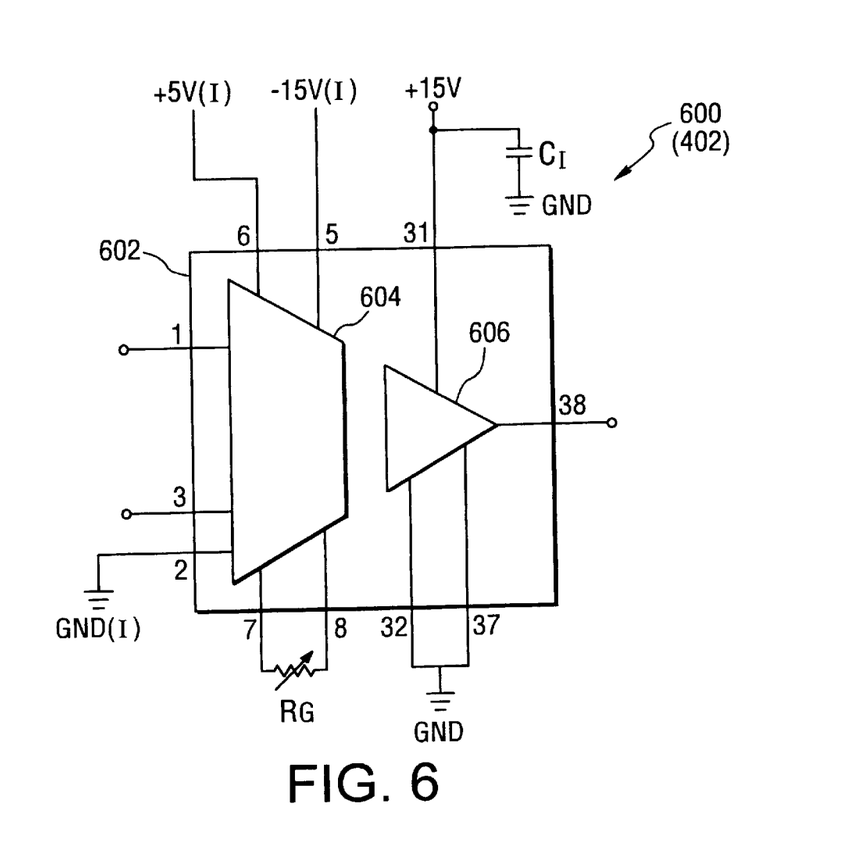
FIG. 6 is a schematic diagram of an isolation instrumentation amplifier according to a detailed embodiment of the invention.

FIG. 6 is a schematic diagram of an isolation instrumentation amplifier 600 according to a detailed embodiment of the invention. The isolation instrumentation amplifier 600, for example, is a detailed implementation for the isolation instrumentation amplifier 402 illustrated in FIG. 4. The isolation instrumentation amplifier 600 is implemented by a packaged integrated circuit 602. As a specific example, the packaged integrated circuit 602 for the isolation instrumentation amplifier 600 can be an ISO-213 isolation amplifier integrated chip produced by Burr-Brown Corporation of Tucson, Ariz. The numbers next to the lines at the boundaries of the packaged integrated circuit 602 represent pin numbers for the ISO-213 isolation amplifier integrated chip. The ISO-213 offers about 115 dB and 160 dB rejection ratios for AC and DC, respectively. Also, the common-mode rejection ratio with respect to input pins 1 and 3 is about 100 dB.

The isolation instrumentation amplifier 600 has a first half 604 and a second half 604. The input signals to be amplified are input to the first half 604 of the isolation instrumentation 600, and the output signal is produced by the second half 606. The first half 604 of the isolation instrumentation amplifier 604 is DC coupled and AC isolated from the second half 606 of the isolation instrumentation amplifier 600. The advantage of the AC isolation is that any unwanted noise, e.g., RF interference, appearing on the input signal lines carrying the voltages $V_{T1}$ and $V_{T2}$ (e.g., pins 1 and 3) is prevented from passing through to the output signal line carrying the voltage $V_I$ (e.g., pin 38). As an example, the AC isolation between the first half 604 and the second half 606 of the isolation instrumentation amplifier 600 may be provided by internally modulating the input signal (e.g., pin 1) in the first half 604, coupling through a transformer from the first half 604 to a second half 606, and then internally demodulating in the second half 606. Therefore, only the DC component of the input signal passes through the isolation instrumentation amplifier 600 to the output signal line carrying the voltage $V_I$.

Further, given that the first half 604 and the second half 606 are electrically isolated, in one the ground used for the first half 604 is separate from the ground used for the second half 606. Specifically, for the isolation amplifier 600 illustrated in FIG. 6, the first half 604 uses the independent ground (GND(I)), while the second half 606 uses a ground (GND). Further, the ground used with circuitry preceding the first half 604 of the isolation instrumentation amplifier 600 (e.g., power supply circuit 500) is the independent ground (GND(I)). In addition, the ground used with the circuitry following the second half 606 of the isolation instrumentation amplifier 600 is the ground (GND). Accordingly, pin 2 of the first half 604 couples to the independent ground (GND(I)), and pins 32 and 37 couple to ground (GND). Also, pins 5 and 6 of the first half 604 of the packaged integrated circuit 602 couple to an independent power supply producing −15 V(I) and +15 V(I), and pin 31 of the second half 606 of the packaged integrated circuit 602 couples to a power supply producing +15 V. As an example, the power supplies can be AC-to-DC converters. Hence, the power and ground supplied to the different halves 604 and 606 are independent of one another so that RF interference is not induced through the power and ground lines.

A capacitor ($C_I$) and a resistor ($R_G$) are also coupled to the integrated circuit product 602. The capacitor ($C_I$) couples the power supply +15 V to ground (GND). The resistor ($R_G$) is an adjustable resistor coupled between pins 7 and 8 of the integrated circuit product 602 and is used to adjust the DC gain of the isolation instrumentation amplifier 600. In one example, the resistor ($R_6$) is an adjustable resistor of about 10 kΩ, the capacitor ($C_I$) is about 22 μF, and the differential DC gain is 3 for the isolation instrumentation amplifier 600.

Figure 7:
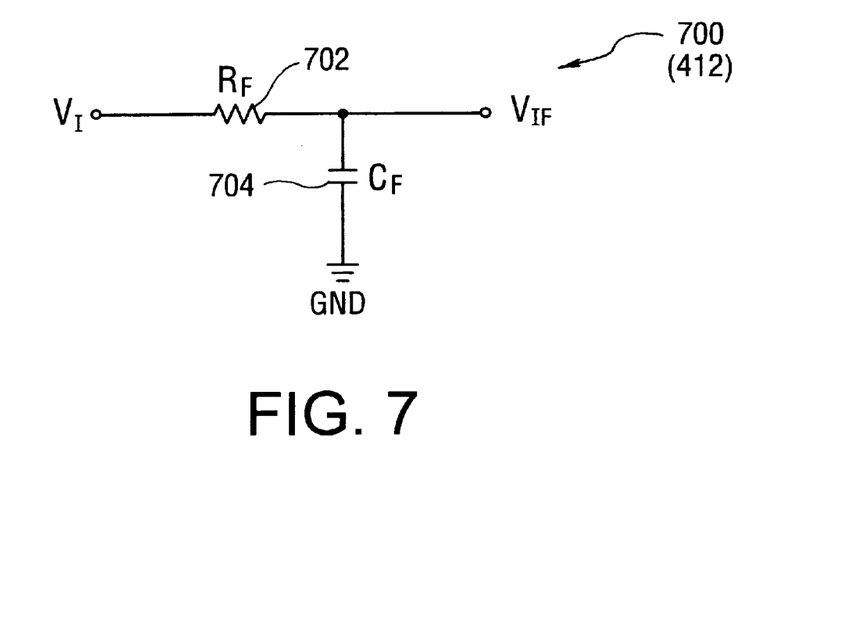
FIG. 7 is a schematic diagram of a low pass filter according to an embodiment of the invention.

FIG. 7 is a schematic diagram of a low pass filter 700 according to an embodiment of the invention. The low pass filter 700 represents a detailed embodiment of the low pass filter (LPF) 412 illustrated in FIG. 4. In particular, the low pass filter 700 includes a resistor ($R_F$) 702 and a capacitor ($C_F$) 704. The low pass filter 700 receives the output voltage ($V_I$) from the isolation instrumentation amplifier 402, 600 and produces a filtered output signal ($V_{IF}$). The low pass filter 700 helps prevent unstable oscillations as well as attenuating high frequency ripples on the output signal ($V_F$) due to residual RF and internal modulation within the isolation instrumentation amplifier 600 (ISO-213). In one example, the resistor ($R_F$) 702 is 5.6 kΩ, the capacitor ($C_F$) 704 is 47 μF, and the cut-off frequency (−3 dB point in power transmission) is 0.6 Hz.

Figure 8:
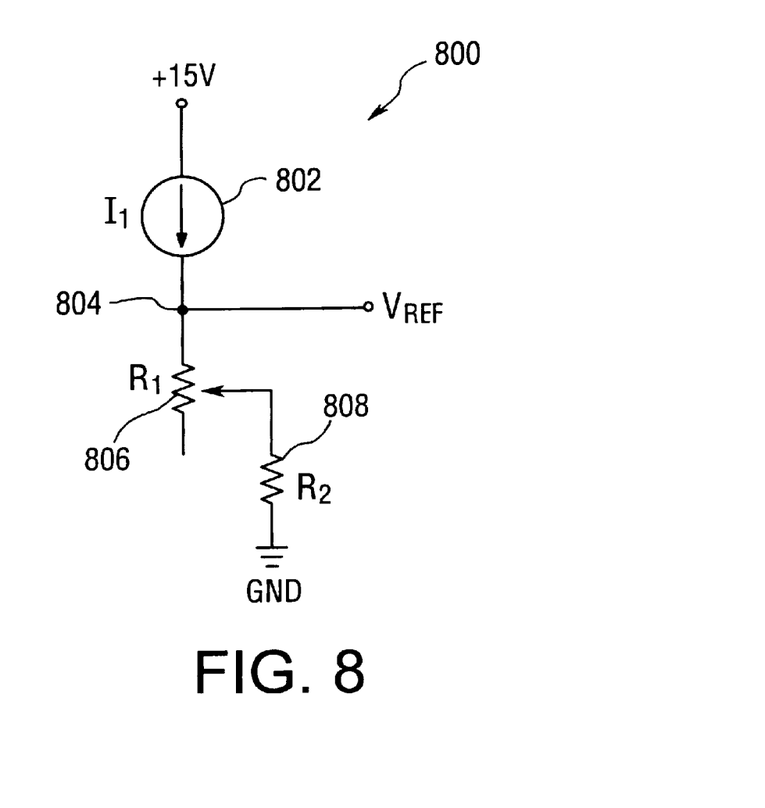
FIG. 8 is a schematic diagram of the reference voltage generating circuit according to an embodiment of the invention.

FIG. 8 is a schematic diagram of the reference voltage generating circuit 800 according to an embodiment of the invention. The reference voltage generating circuit 800 generates the reference voltage ($V_{REF}$) to be used by the instrumentation amplifier 414. In this embodiment, a current source ($I_1$) 802 is coupled between a positive supply potential (e.g., +15 V) and an output node 804. Resistors ($R_1$ and $R_2$) 806 and 808 are coupled between the first node 804 and ground (GND). The resistor ($R_1$) 806 is a variable resistor that permits the reference voltage ($V_{REF}$) to be varied. The ability to adjust the reference voltage ($V_{REF}$) provides an offset adjustment that is useful to improve the temperature selectivity for a specified temperature range. The reference voltage ($V_{REF}$) is obtained from the output node 804 of the reference voltage generating circuit 800.

Figure 9:
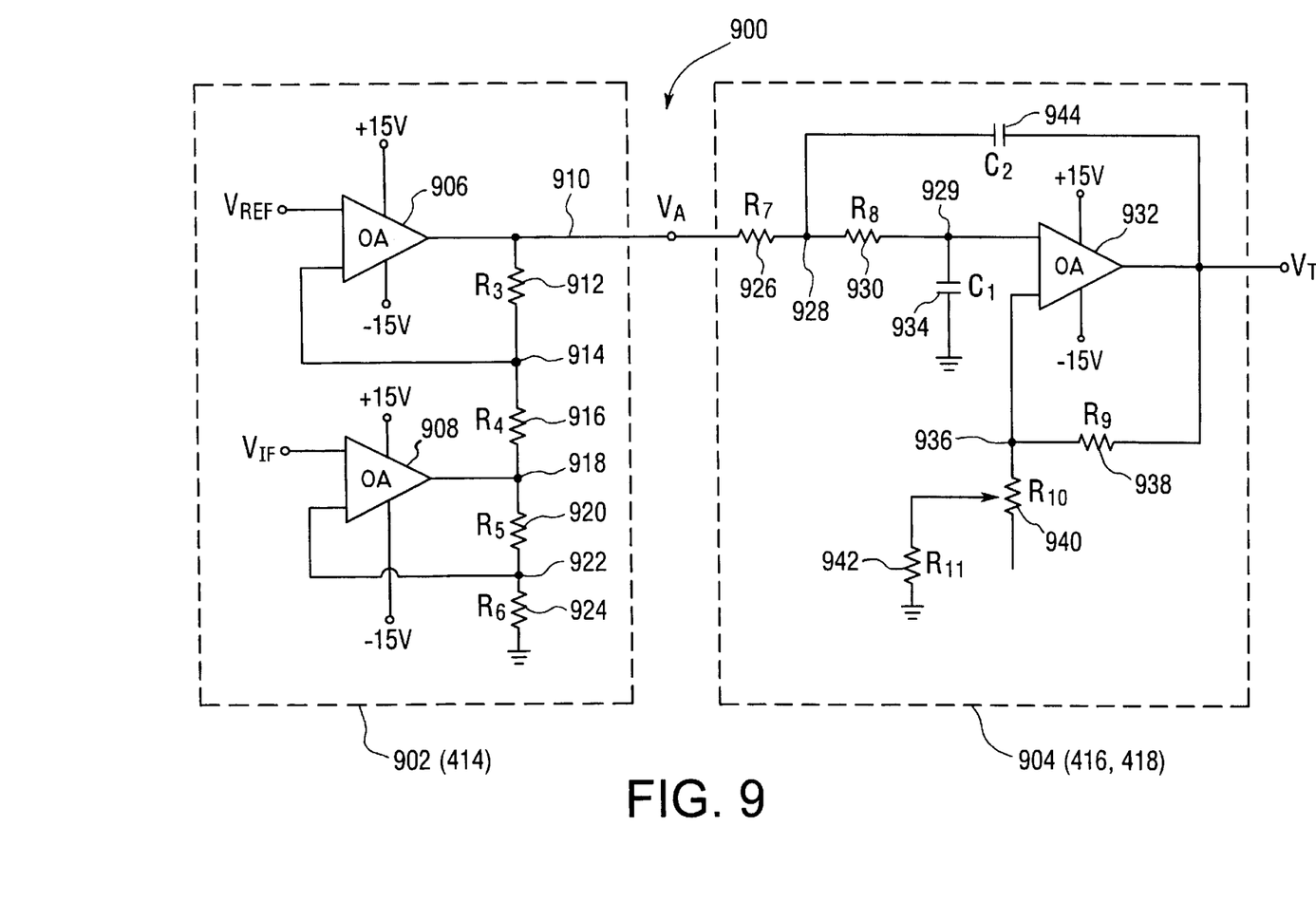
FIG. 9 is a schematic diagram of an output circuit with voltage reference and gain adjustments according to an embodiment of the invention.

FIG. 9 is a schematic diagram of an output circuit 900 with voltage reference and gain adjustments according to an embodiment of the invention. The output circuit 900 includes an instrumentation amplifier 902 and an output conditioning circuit 904. The instrumentation amplifier 902 represents a detailed embodiment of the instrumentation amplifier 414, and the output conditioning circuit 904 represents a detailed embodiment of the active LPF 416 and the adjustable gain DC amplifier 418.

The instrumentation amplifier 902 includes operational amplifiers (OA) 906 and 908. The operational amplifiers (OA) 906 and 908 are supplied with a positive supply potential (e.g., +15 V) and a negative supply potential (e.g., −15 V). A first input terminal of the operational amplifier 906 receives the reference voltage ($V_{REF}$), and the first input terminal for the operational amplifier 908 receives the filtered output voltage ($V_{IF}$). An output line 910 from the instrumentation amplifier 902 outputs the amplified voltage signal ($V_A$) from the instrumentation amplifier 902. A resistor ($R_3$) 912 is connected between the output line 910 and a first node 914. A resistor ($R_4$) 916 is connected between the first node 914 and a second node 918. A resistor ($R_5$) 920 is connected between the second node 918 and a third node 922. Another resistor ($R_6$) 924 is connected between the third node 922 and ground (GND). Further, the second input terminal for the operational amplifier 906 is connected to the first node 914, and the second input terminal for the operational amplifier 908 is connected to the third node 922. In one example, the operational amplifiers are LF412 operational amplifiers by National Semiconductor, and the resistors 912, 916, 920 and 924 are 20 kΩ and matched to better than 1%. For this example, the corresponding differential gain of the instrumentation amplifier 902 is 2.

The output conditioning circuit 904 receives the amplified output signal ($V_A$) from the instrumentation amplifier 902 at a resistor ($R_7$) 926 that is coupled between the output line 910 of the instrumentation amplifier 902 and a node 928 of the output conditioning circuit 904. A resistor ($R_8$) 930 is connected between the node 928 and a node 929. A first input terminal of an operational amplifier 932 is coupled to the node 929. As an example, the operational amplifier 932 may be a Burr-Brown OPA27. The node 929 is also coupled to ground (GND) through a capacitor ($C_1$) 934. The power for the operational amplifier 932 is provided by positive and negative supply potentials (e.g., +15 V and −15 V). The second input terminal for the operational amplifier 932 is connected to a node 936. The node 936 is connected to an output terminal of the operational amplifier 932 through a resistor ($R_9$) 938. In addition, the node 936 is coupled to ground through resistors 940 ($R_{10}$) and 942 ($R_{11}$). Additionally, the output conditioning circuit 904 includes a capacitor ($C_2$) 944 between the output terminal of the operational amplifier 932 and the node 928. The output of the output conditioning circuit 904 is the output temperature voltage ($V_T$) which is supplied from the output terminal of the operational amplifier 932. For DC, the output conditioning circuit 904 behaves like a DC amplifier, whose gain is determined by the ratio of the resistance of the resistor ($R_9$) 938 to the sum of the resistances of resistors 940 ($R_{10}$) and 942 ($R_{11}$). The resistor ($R_{10}$) 940 is an adjustable resistor that permits the gain of the output conditioning circuit 904 to be adjusted. For AC, the output conditioning circuit 904 acts as an active low pass filter. Specifically, in this embodiment the output conditioning circuit 904 is a two-pole filter and is equivalent to the cascade of two basic RC filters. The output conditioning circuit 904 is also referred to as a voltage-controlled voltage-source filter.

In one embodiment, the output conditioning circuit 904 is used to filter out the RF interference (e.g., 13.56 MHz) and modulation frequency of ISO-213 (e.g., 25 kHz). Also, as specific examples, the resistors 926, 930, 938, 940 and 942 are 121 kΩ, 121 kΩ, 10 kΩ, 20 kΩ and 2.37 kΩ, respectively, and the capacitors 934 and 944 are 0.47 $\mu$F and 68 nF, respectively. The DC gain of the output conditioning circuit 904 can be varied from 1.4 to 5.2. The cut-off frequency (−3 dB point in power transmission) for the resistor $R_7$ and the capacitor $C_2$ is 19.3 Hz, and cut-off frequency for the resistor $R_8$ and the capacitor $C_1$ is 2.8 Hz.

The invention is suitable for monitoring the temperature of various devices, components and apparatuses. One particular application of the invention is monitoring and measuring temperatures within semiconductor manufacturing equipment, such as etching, deposition, and other processing chambers. Typically, semiconductor manufacturing equipment uses radio frequencies in processing wafers into integrated circuit chips. These radio frequencies normally are high power and have high voltages. In addition, the semiconductor processing performed within the processing chambers is also very sensitive to contamination from undesired substances within the processing chambers. Hence, in such an environment, the temperature sensing system must be able to not only withstand severe radio frequency interference, but also not perturb the delicate semiconductor processing being performed by the semiconductor manufacturing equipment. The invention is able to meet these objectives.

The invention is suitable for monitoring and measuring the temperature internal to the processing chambers of semiconductor manufacturing equipment. Several embodiments of the invention are discussed below with reference to FIGS. 10–12 which illustrate monitoring and measuring temperature of several different components, devices or areas internal to a processing chamber.

Figure 10A:
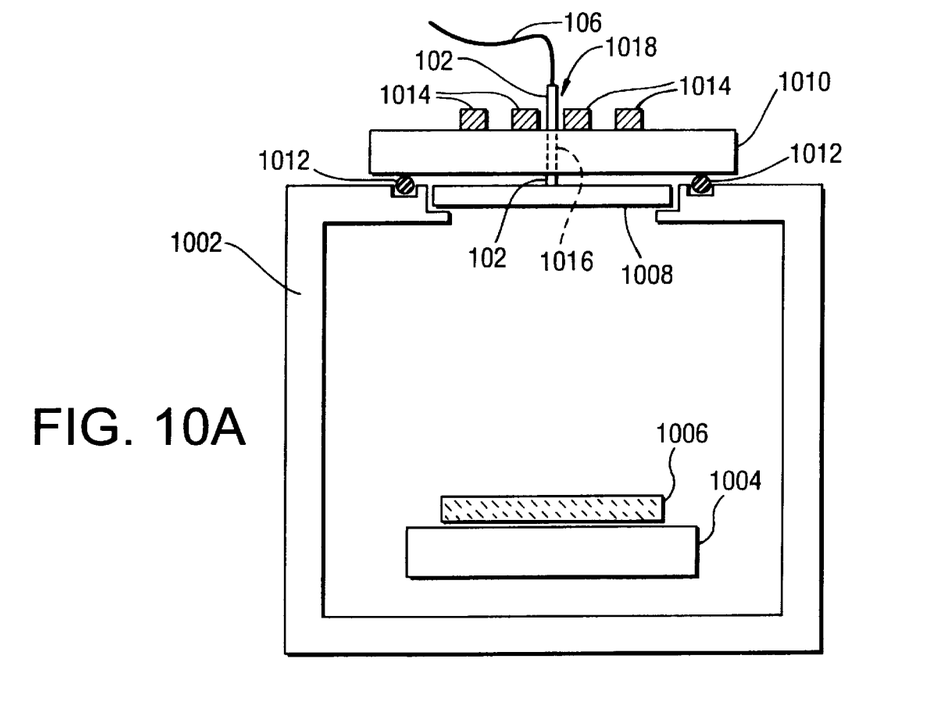
FIG. 10A is a diagram of a first temperature monitoring arrangement for a processing chamber according to an embodiment of the invention.

FIG. 10A is a diagram of a first temperature monitoring arrangement 1000 for a processing chamber 1002 according to an embodiment of the invention. The processing chamber 1002 contains a bottom electrode and a chuck 1004 that hold a wafer 1006. The wafer 1006 is being processed in the processing chamber 1002. Examples of the processing performed within the processing chamber 1002 include etching and deposition. In the case of a plasma etch process, the processing chamber 1002 includes a gas distribution plate (GDP) 1008. The gas distribution plate 1008 is typically located at an upper portion of the processing chamber 1002 that has an opening over which a window 1010 (e.g., TCP window) is placed and sealed by the use of a gasket 1012. The gas distribution plate 1008 operates to control the gas distribution used in the plasma etch process. In one embodiment, the window 1010 includes an antenna 1014 on the upper surface of the window 1010. The antenna 1014 is used to produce the RF field for the plasma etch process. RF power is delivered to a Transformer Coupled Plasma (TCP) antenna coils (i.e., antenna 1014), whose cross section is shown in FIG. 10A. The TCP antenna coils are used to strike a discharge and create a plasma in the processing chamber 1002 through inductive coupling.

According to the invention, the temperature of the gas distribution plate 1008 located within the processing chamber 1002 is able to be monitored without interfering with the processing otherwise being performed in the processing chamber 1002. In this embodiment, a hole 1016 is placed through the window 1010. The hole 1016 is positioned at a location 1018 on the window 1010 between two of the TCP antenna coils 1014 and does not interfere with the antenna 1014. The temperature sensing probe 102 is then passed through the opening 1016 and contacts the surface of the gas distribution plate 1008. The temperature sensing system according to the invention is then able to accurately monitor the temperature of the gas distribution plate 1008.

In this embodiment, the forward end (i.e., the cap 204) of the temperature sensing probe 102 preferably mechanically contacts the surface of the gas distribution plate 1008. The thermal coupling can be further enhanced by providing a layer of thermally conductive material (e.g., grease) between the cap 204 of the temperature sensing probe 102 and the gas distribution plate 1008.

In general, the temperature sensing probe and the article 104 whose temperature is being monitored need to be thermally coupled and thus should be positioned proximate to one another. A mechanical contact generally ensures a good thermal coupling, mechanical contact is desirable but not required. Mechanical coupling can be provided by an apparatus that exerts a force on the temperature sensing probe to press it against the article 104.

Preferably, the outer surface of the temperature sensing probe 102 has a plastic sleeve placed thereon to ensure a snug fit and thus prevent leakage (e.g., vacuum seal) from the chamber 1002 during processing within the processing chamber 1002. In one embodiment, a plastic housing is placed in the opening 1016 and bonded to the window 1010. The temperature sensing probe 102 slides into the plastic housing and through the window 1010. The temperature sensing device 216 is preferably bonded to the cap 204 of the housing 202 using a high thermal conductivity, insulating (alumna loaded) epoxy.

Figure 10B:
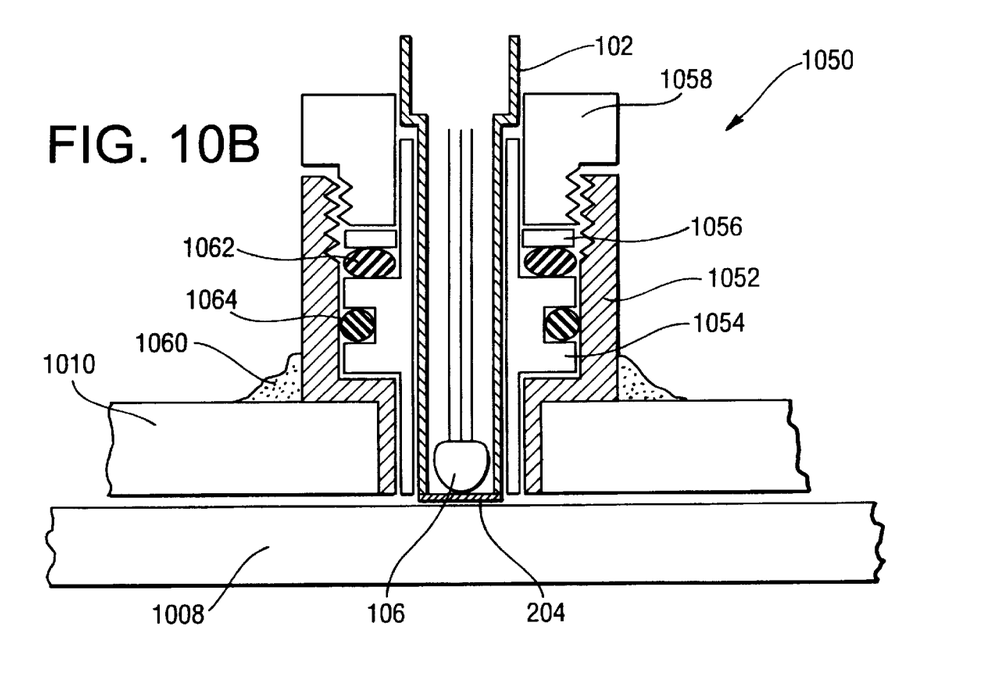
FIG. 10B is a schematic diagram of a plastic sleeve according to an embodiment of the invention.

In one embodiment, such as illustrated in FIG. 10B, a plastic mounting apparatus 1050 includes a plastic housing 1052, a plastic sleeve 1054, a plastic washer 1056 and a plastic nut 1058. The temperature sensing probe 102 first slides into the plastic nut 1058 having threads that match those on the plastic housing 1052. The temperature sensing probe 102 is then slid into the plastic washer 1056 and the plastic sleeve 1054. The plastic housing 1052 can be bonded to the window 1010 with epoxy 1060, for example. The plastic sleeve 1054 uses two O-rings 1062 and 1064 to create a seal. The plastic sleeve 1054 together with the temperature sensing probe 102 are slid into the plastic housing 1052. The forward end (i.e., the cap 204) of the temperature sensing probe 102 is positioned slightly beyond the end of the plastic sleeve 1054 so that the forward end of the temperature sensing probe 102 contacts with the gas discharge plate 1008 when the plastic sleeve 1054 and the temperature sensing probe 102 are slid down into the plastic housing 1052 and screwed down with the plastic nut 1058. The O-rings 1062 and 1064 and the plastic nut 1058 also seal the opening 1016 in the window 1010 from ambient gas pressure.

In any case, a calibration procedure can be used to compensate for the different levels of thermal contact between the temperature sensing probe 102 and the article 104. Calibration of the temperature sensing system can be performed in a variety of different ways. There is always some temperature gradient between the temperature sensing device and the surface of interest. The temperature gradient can be rather large if a thermally conductive material (e.g., thermally conductive epoxy) is not used between the temperature sensing device and the end (cap 204) of the housing 202 or between the end of the housing 202 and the surface of interest. One way to calibrate the temperature sensing system according to the invention is to mount a thermocouple and the sensor probe proximate to one another on a surface. Preferably, the surface used in the calibration is the same material with the same surface finish (e.g., flatness and roughness). A thermocouple is pressed down and bonded with the surface using thermally conductive epoxy. The imperfect contact of contact of the sensor probe is then calibrated against the thermocouple which has a good thermal contact. The calibration procedure not only compensates for imperfect thermal contact between the sensor probe and the article whose temperature is be monitored but also optimizes operation for a desired temperature range. In general, the sensitivity is preferably optimized for the temperature range of interest using the offset adjustment. The gain adjustment can then be adjusted to provide a suitable dynamic range. The calibration thus yields the sensitivity as V/° C. at a given temperature (e.g., room temperature). The offset can be adjusted to correct any possible temperature gradient, while the gain can be adjusted to provide a simple conversion selectivity (e.g., 10 ° C./V). In the case of measuring the temperature of the gas distribution plate 1008, the temperature range of interest is 20–80 ° C. so the temperature sensing system should be calibrated to this temperature range.

In one embodiment using a linear thermistor network to monitor the temperature of the gas distribution plate 1008, the calibration procedure is straight forward since voltage response vs. temperature is linear. The temperature range of interest is 20–80° C., and typical temperature is around 40 ° C. The temperature of the surface is raised slowly by uniform heating. When the temperature is at 30.0° C., read by the thermocouple, the variable resistor ($R_1$) 806 is adjusted (i.e., offset adjustment) to null the output of the circuit 400, i.e. $V_T$=0.00 V. As the temperature is further heated up, the variable resistor ($R_{10}$) 940 is adjusted (i.e., gain adjustment) such that $V_T$=1.0 V at 40.0 ° C., yielding sensitivity 10° C./V. After being stabilized, the resistor ($R_1$) 806 is re-adjusted so that $V_T$=4.0 V at 40.0 ° C. Therefore the conversion from voltage read out to temperature is simply: voltage(V)×10=Temperature (° C.). Since there is a non-linearity with the linear thermistor network, it is necessary to measure $V_T$ vs. temperature for the entire temperature range of 20–80° C. in order to obtain a precise conversion. A linear regression of $V_T$ vs. T can be obtained and can be easily incorporated into a computer which controls the equipment.

Figure 11A:
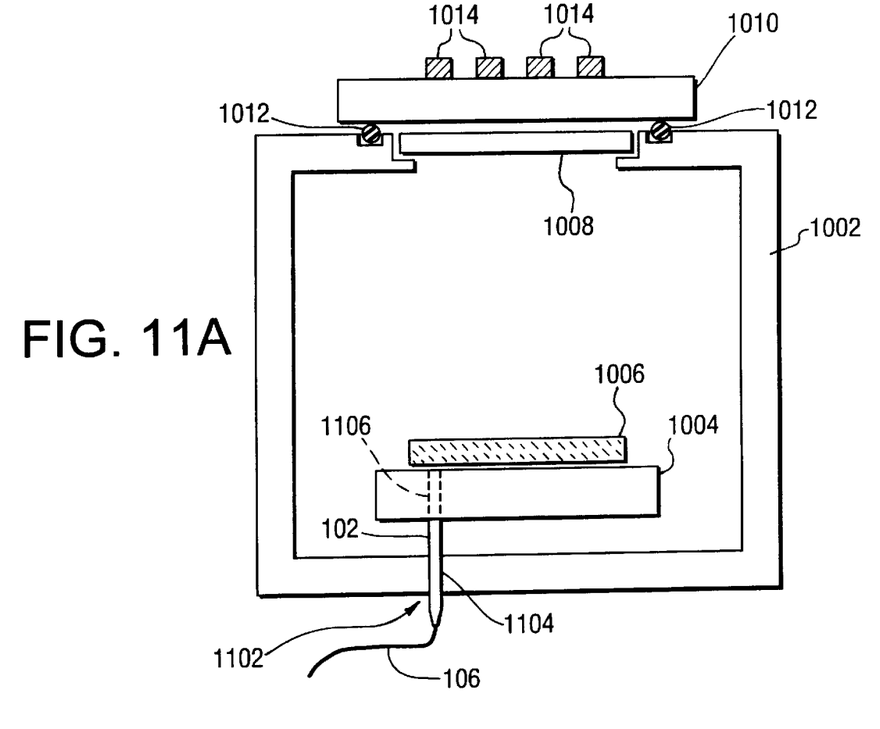
FIG. 11A is a diagram of a second temperature monitoring arrangement for the processing chamber according to another embodiment of the invention.

FIG. 11A is a diagram of a second temperature monitoring arrangement 1100 for the processing chamber 1002 according to another embodiment of the invention. In this embodiment, the processing chamber 1002 is the same as the representative processing chamber illustrated in FIG. 10A. However, in this embodiment, the temperature of the wafer 1006 is being measured by the temperature sensing system according to the invention. Namely, an opening 1102 is placed in the wall of the processing chamber 1002 to permit the temperature sensing probe 102 to enter into the processing chamber 1002. Further, a hole 1106 is provided through the chuck and the bottom electrode 1004. The temperature sensing probe 102 passes through the opening 1104 and into the hole 1106 such that the temperature sensing probe 102 contacts the wafer 1006. Preferably, there is a vacuum seal at the opening 1104 and a force applied to exert the temperature sensing probe 102 against the wafer 1006 to ensure good thermal coupling. A layer of ceramic is also preferably provided for electrical isolation between the side wall of the hole 1106 through the chuck and bottom electrode 1004 and the housing 202 of the temperature sensing probe. In addition, a layer of insulation is preferably placed on the top of the cap 204 to provide DC insulation when the wafer 1006 is DC biased and the wafer surface is conductive (e.g., poly silicon or metal etch).

Figure 11B:
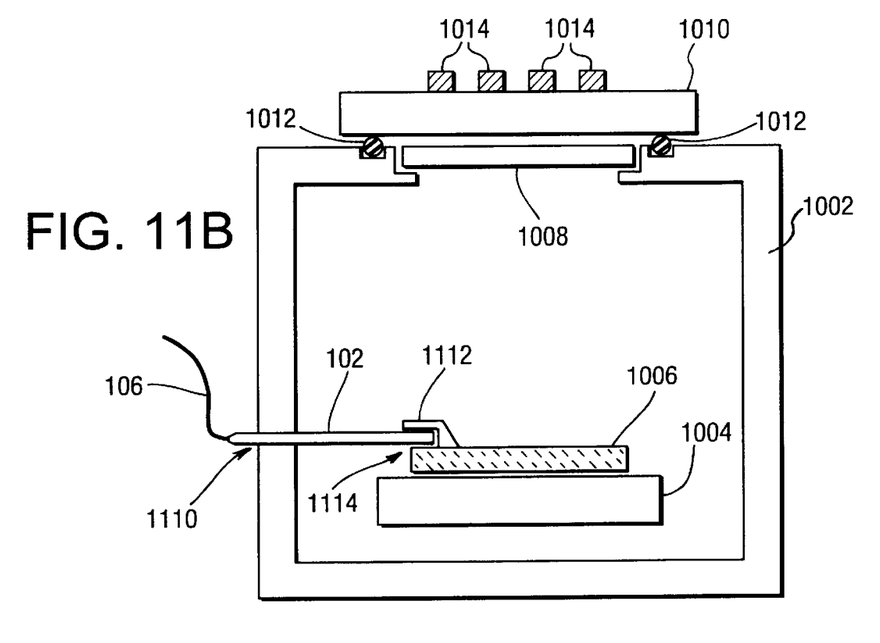
FIG. 11B is a diagram of a third temperature monitoring arrangement for the processing chamber according to still another embodiment of the invention.

FIG. 11B is a diagram of a third temperature monitoring arrangement 1108 for the processing chamber 1002 according to still another embodiment of the invention. The processing chamber 1002 is the same as the representative processing chamber illustrated in FIG. 10A. In this embodiment, the temperature of the wafer 1006 is being measured by the temperature sensing system according to the invention. In this embodiment, the temperature of the wafer 1006 is monitored from the side, whereas in the embodiment illustrated in FIG. 11A the temperature of the wafer 1006 was monitored from below (namely, access through the chuck and bottom electrode 1004). Here, an opening 1110 is provided in the wall of the processing chamber 1002. A barrier region 1112 is also formed on an edge portion of the wafer 1006. As an example, the barrier region 1112 can be made from plastic, ceramic or photoresist. The temperature sensing probe 102 is then inserted through the opening 1110 and into a recess area 1114 formed by the barrier region 1112. The wafer-side of the inserted temperature sensing probe 102 contacts the surface of the wafer 1006 directly or through a layer of thermally conductive material (e.g., thermally conductive epoxy). The temperature of the wafer 1006 is able to be measured while the wafer 1006 is present and being operated upon in the processing chamber 1002. The barrier region 1112 protects the metallic housing 202 of the temperature sensing probe 102 from ion bombardment that could otherwise sputter off metal atoms and cause contamination to the wafer 1006.

Accordingly, in this embodiments in FIGS. 11A and 11B, the temperature monitoring arrangement 1108 is able to monitor the temperature of the wafer 1006 while being processed on in the processing chamber 1002. Since the chuck and the bottom electrode 1004 is RF powered and a self-biased voltage is produced on the wafer 1006, the RF interference and electric fields near the wafer 1006 are strong. Accordingly, the RF shielding provided by the invention needs to be very effective.

Figure 12:
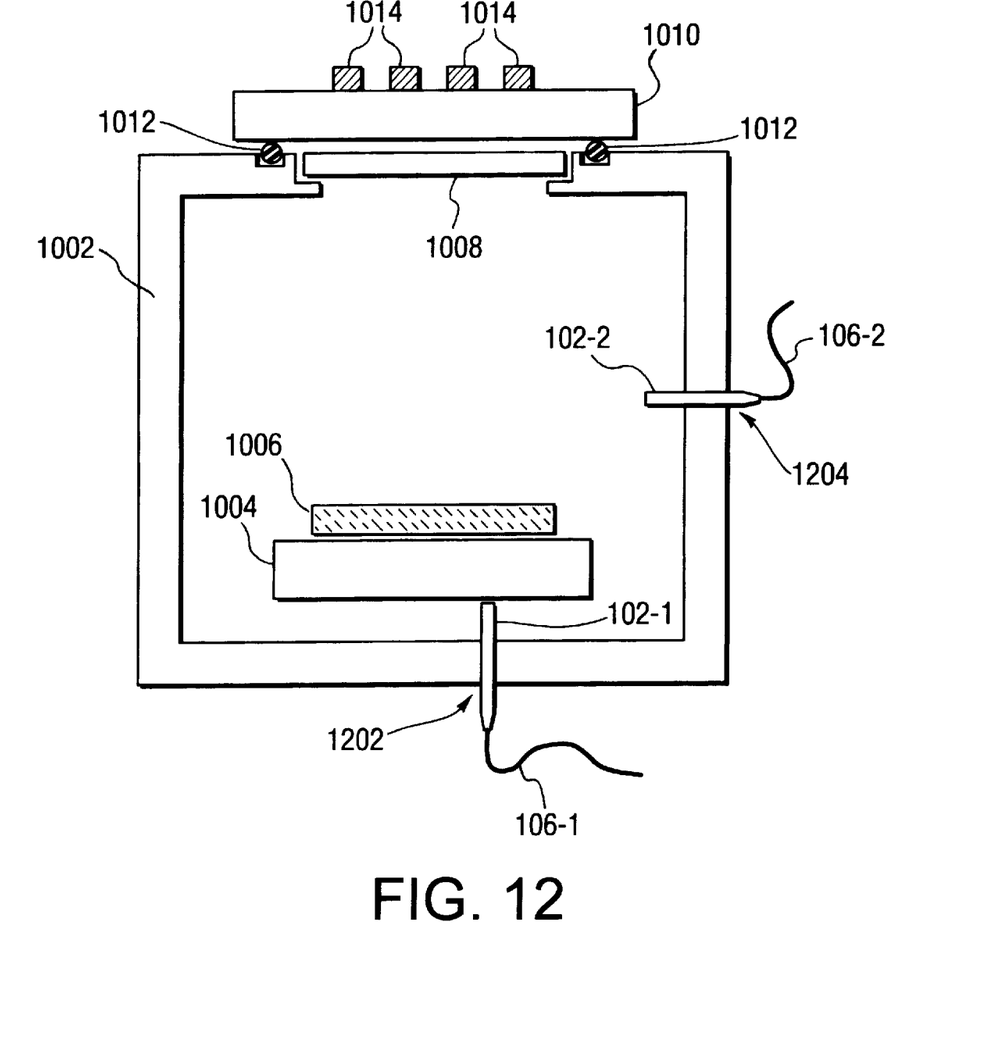
FIG. 12 is a diagram of a fourth temperature sensing arrangement for the processing chamber according to an embodiment of the invention.

FIG. 12 is a diagram of a fourth temperature sensing arrangement 1200 for the processing chamber 1002 according to an embodiment of the invention. The processing chamber 1200 is similar to the representative processing chamber illustrated in FIG. 10A. In the fourth temperature sensing arrangement 1200, multiple temperature sensing probes are provided so that temperatures of different articles or areas within the processing chamber 1002 can be monitored. In this embodiment, two temperature sensing probes 102-1 and 102-2 are respectively provided in openings 1202 and 1204 in the processing chamber 1002. The temperature sensing probe 102-1 monitors the temperature of the chuck and the bottom electrode 1004, and the temperature sensing probe 102-2 measures the ambient temperature of the processing gas within the processing chamber 1002. Each of the temperature sensing probes 102-1 and 102-2 respectively have their own cable 106-1 and 106-2 which are supplied to a common processing circuit or separate processing circuits. The mounting of these temperature sensing probes 102-1 and 102-2 is done in similar ways to those in FIGS. 10 and 11.

Various components should be connected to a common ground. In one embodiment, an antenna housing (not shown) covers the antenna 1014 and the window 1010, and the antenna housing and the filter box 300 are grounded by 0.5" wide braided copper strips directly to the ground of 110 VAC power lines. Although the antenna housing has been grounded through a RF power supply, this additional grounding provides the same ground to the RF inside the antenna housing and the RF filtering outside the antenna housing. In this way, the RF pick-up by the temperature sensing device (which is referenced to the antenna housing) can be effectively filtered out by the cable shield 208 (which is grounded through the filter circuit 330) and by the other filter circuitry within the filter box 300.

Examples have shown RF interference is able to be attenuated by at least 43 dB at 13.56 MHz using a thermistor as a temperature sensing device.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A temperature sensing system, comprising:
   a sensor probe having a housing and a thermal sensing device positioned within the housing, the thermal sensing device produces an electrical signal based on a measured temperature;
   a shielded cable coupled to said sensor probe, said shielded cable includes at least one wire;
   a RF filter circuit coupled to the at least one wire within said shielded cable, said RF filter circuit receives the electrical signal produced by said sensor probe via said shielded cable and removes significant amounts of RF interference from the electrical signal and outputs a filtered electrical signal; and
   a control circuit coupled to said RF filter circuit, said control circuit amplifies the filtered electrical signal.

2. A temperature sensing system as recited in claim 1, wherein said control circuit isolates AC components in the filtered electrical signal and amplifies DC components of the filtered electrical signal.

3. A temperature sensing system as recited in claim 1, wherein said temperature sensing system effectively measures the measured temperature even when the sensor probe is subjected to a substantial amount of RF interference.

4. A temperature sensing system as recited in claim 3,
   wherein said shielded cable includes wires, and
   wherein the first end of the housing is closed, and the thermal sensing device is positioned proximate to the first end of the housing.

5. A temperature sensing system as recited in claim 1, wherein the housing has a first end that contacts with an article or area to obtain the measured temperature thereof, and a second end that has an opening to receive an end of said shielded cable.

6. A temperature sensing system as recited in claim 1,
   wherein said shielded cable has a shield, and
   wherein the shield is directly grounded to provide shielding from RF interference.

7. A temperature sensing system as recited in claim 1,
   wherein said temperature sensing system is used with a semiconductor processing equipment,
   wherein said shielded cable has a shield, and
   wherein the shield is grounded through an inductor to provide DC grounding while not perturbing RF tuning and discharge of a semiconductor processing chamber in the semiconductor processing equipment.

8. A temperature sensing system as recited in claim 1,
   wherein said temperature sensing system is used with a semiconductor processing equipment,
   wherein said shielded cable has a shield, and
   wherein the shield is grounded through an inductor and a capacitor connected in parallel to provide transient suppression in addition to DC grounding and less perturbation to RF tuning and discharge of a semiconductor processing chamber in the semiconductor processing equipment.

9. A temperature sensing system as recited in claim 1,
   wherein the housing has a first end that contacts with an article or area to obtain the measured temperature thereof, and a second end that has an opening to receive an end said shielded cable,
   wherein said temperature sensing system is used with a semiconductor processing equipment, and
   wherein said shielded cable includes an inner shield that provides shielding against RF interference, and an outer shield for safe operation where said shielded cable extends outside of a semiconductor processing chamber of the semiconductor processing equipment.

10. A temperature sensing system as recited in claim 9, wherein a single common ground from an AC power supply is provided for said control circuit, the outer shield, the semiconductor processing chamber, and said RF filter circuit.

11. A temperature sensing system as recited in claim 1,
    wherein said shielded cable includes wires, and
    wherein the thermal sensing device produces a plurality of electrical signals that couple to the wires within said shielded cable.

12. A temperature sensing system as recited in claim 1,
    wherein the housing has a first end that contacts with an article or area to obtain the measured temperature thereof, and
    wherein the article or area is internal to a semiconductor processing chamber of a piece of semiconductor manufacturing equipment.

13. A temperature sensing system as recited in claim 12, wherein said shielded cable includes at least two wires connected to said sensor probe, an inner shield connected to the housing of said sensor probe, and an outer shield where said shielded cable extends outside of the semiconductor processing chamber.

14. A temperature sensing system as recited in claim 12, wherein the semiconductor processing chamber has an opening capable of receiving said sensor probe so that the first end of the housing of said sensor probe is able to contact with the article or area internal to the semiconductor processing chamber.

15. A temperature sensing system as recited in claim 14, wherein a mechanical force is exerted on said sensor probe to push said sensor probe against the article or area internal to the semiconductor processing chamber to improve thermal conductivity between the first end of the housing of said sensor probe and the article or area internal to the semiconductor processing chamber.

16. A temperature sensing system as recited in claim 15, wherein the opening in the semiconductor processing chamber is fully filled by said sensor probe and a gasket positioned between the opening and said sensor probe.

17. A temperature sensing system as recited in claim 1, wherein said RF filter circuit and said control circuit together provide a series of filtering operations to remove large quantities of RF interference that is picked-up by said sensor probe.

18. A temperature sensing system as recited in claim 1, wherein said control circuit is RF shielded from said RF filter circuit.

19. A temperature sensing probe, comprising:
    a housing containing a thermal sensing device positioned within the housing, the thermal sensing device produces an electrical signal based on a measured temperature; and a shielded cable containing a least one wire, the at least one wire receives the electrical signal from the thermal sensing device.

20. A temperature sensing probe as recited in claim 19, wherein the thermal sensing device comprises a thermistor.

21. A temperature sensing probe as recited in claim 19, wherein the thermal sensing device is a solid state sensor.

22. A temperature sensing probe as recited in claim 19, wherein at least a major portion of the housing is made of stainless steel and/or brass.

23. A temperature sensing probe as recited in claim 19, wherein the housing is a metallic material that is electrically conductive.

24. A temperature sensing probe as recited in claim 19, wherein the housing has a thickness at least as thick as a skin depth for a lowest RF frequency of interest.

25. A temperature sensing probe as recited in claim 19, wherein the housing has a first end and a second end, the first end of the housing is closed and the thermal sensing device is positioned proximate to the first end of the housing, and the second end has an opening to receive an end of said shielded cable.

26. A temperature sensing probe as recited in claim 25,
wherein the shielded cable includes an inner shield and an outer shield, the inner shield and the outer shield are separated by an insulating layer and are concentric with one another and with a least one wire, and
wherein the opening in the second end of the housing is soldered to the outer shield of the end of the shielded cable received in the opening at the second end of the housing.

27. A temperature sensing probe as recited in claim 25, wherein the housing has a first end and a second end, the first end of the housing is closed and the thermal sensing device abuts against the first end of the housing.

28. A temperature sensing probe as recited in claim 27, wherein a layer of thermal material is placed between the first end of the housing and the thermal sensing device.

29. A temperature sensing system, comprising:
a temperature sensing device that produces an electrical signal based on a measured temperature;
RF filter means for receiving the electrical signal produced by said temperature sensing device and removing significant amounts of RF interference from the electrical signal and outputs a filtered electrical signal;
isolation means for rejecting residual RF interference from the filtered electrical signal; and
amplification means for amplifying the filtered electrical signal.

30. A temperature sensing system as recited in claim 29, wherein said temperature sensing system further comprises:
RF shielding means for providing RF shielding for the electrical signal.

31. A temperature sensing system as recited in claim 29, wherein said temperature sensing system effectively measures the measured temperature even when the temperature sensing probe is subjected to a substantial amount of RF interference.

32. A temperature sensing system as recited in claim 29, wherein the temperature sensing device is contained within an electrically conductive housing having a first end that contacts with an article or area to obtain the measured temperature thereof.

33. A temperature sensing system as recited in claim 32, wherein the article or area is internal to a semiconductor processing chamber of a piece of semiconductor manufacturing equipment.

* * * * *